(12) United States Patent
Ogawa

(10) Patent No.: US 11,651,167 B2
(45) Date of Patent: May 16, 2023

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Masakazu Ogawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 185 days.

(21) Appl. No.: 17/143,316

(22) Filed: Jan. 7, 2021

(65) Prior Publication Data

US 2022/0050974 A1 Feb. 17, 2022

(30) Foreign Application Priority Data

Aug. 17, 2020 (JP) .............................. JP2020-137621

(51) Int. Cl.
| | |
|---|---|
| *G06F 40/58* | (2020.01) |
| *G11B 27/00* | (2006.01) |
| *H04N 21/488* | (2011.01) |
| *H04N 21/81* | (2011.01) |
| *H04N 21/43* | (2011.01) |
| *G11B 27/034* | (2006.01) |

(52) U.S. Cl.
CPC ............ *G06F 40/58* (2020.01); *G11B 27/005* (2013.01); *G11B 27/034* (2013.01); *H04N 21/4307* (2013.01); *H04N 21/4882* (2013.01); *H04N 21/8106* (2013.01)

(58) Field of Classification Search
CPC ..... G06F 40/58; G11B 27/005; G11B 27/034; H04N 21/4307; H04N 21/4882; H04N 21/8106
See application file for complete search history.

(56) References Cited

U.S. PATENT DOCUMENTS

| | | | |
|---|---|---|---|
| 7,330,640 B2 | 2/2008 | Schultz et al. | |
| 2010/0183278 A1* | 7/2010 | Black ................... | G11B 27/034 |
| | | | 348/E7.003 |
| 2014/0201631 A1* | 7/2014 | Pornprasitsakul ...... | G06F 40/58 |
| | | | 715/716 |
| 2018/0040351 A1* | 2/2018 | Ransdell ............... | G11B 27/323 |
| 2019/0104259 A1* | 4/2019 | Angquist ............... | G11B 27/34 |

FOREIGN PATENT DOCUMENTS

| | | |
|---|---|---|
| JP | 2000-270263 A | 9/2000 |
| JP | 5676087 B2 | 2/2015 |
| JP | 6601944 B2 | 11/2019 |

* cited by examiner

*Primary Examiner* — Md S Elahee
*Assistant Examiner* — David Siegel
(74) *Attorney, Agent, or Firm* — Oliff PLC

(57) ABSTRACT

An information processing apparatus includes a processor configured to acquire video data that enables playback of a video in which audio, an image, and a caption are chronologically synchronized, receive a section of a playback time of the video, the section being to be removed, and remove a partial caption that corresponds to the audio in the received section and that is at least a portion of the caption from the image in the received section.

14 Claims, 17 Drawing Sheets

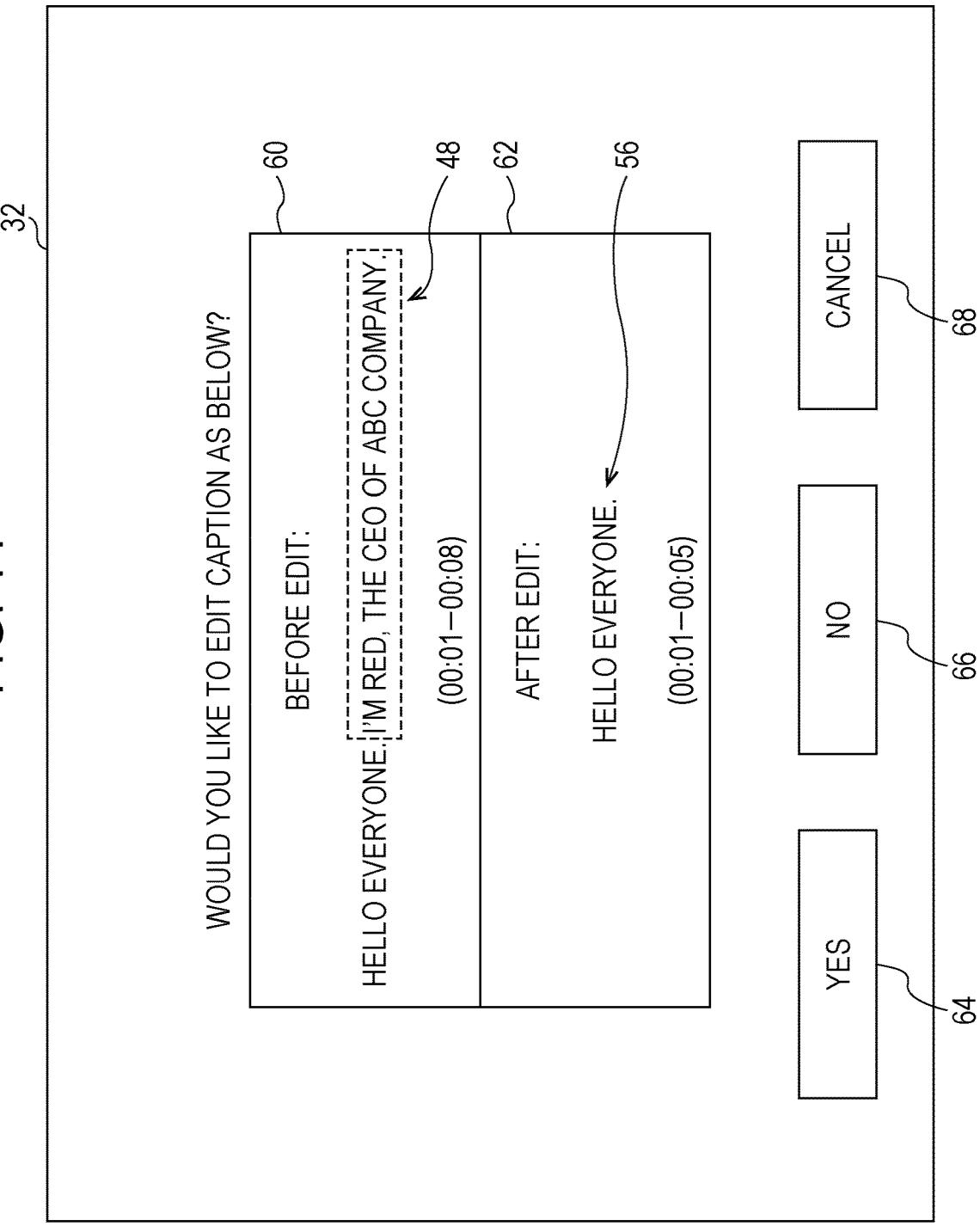

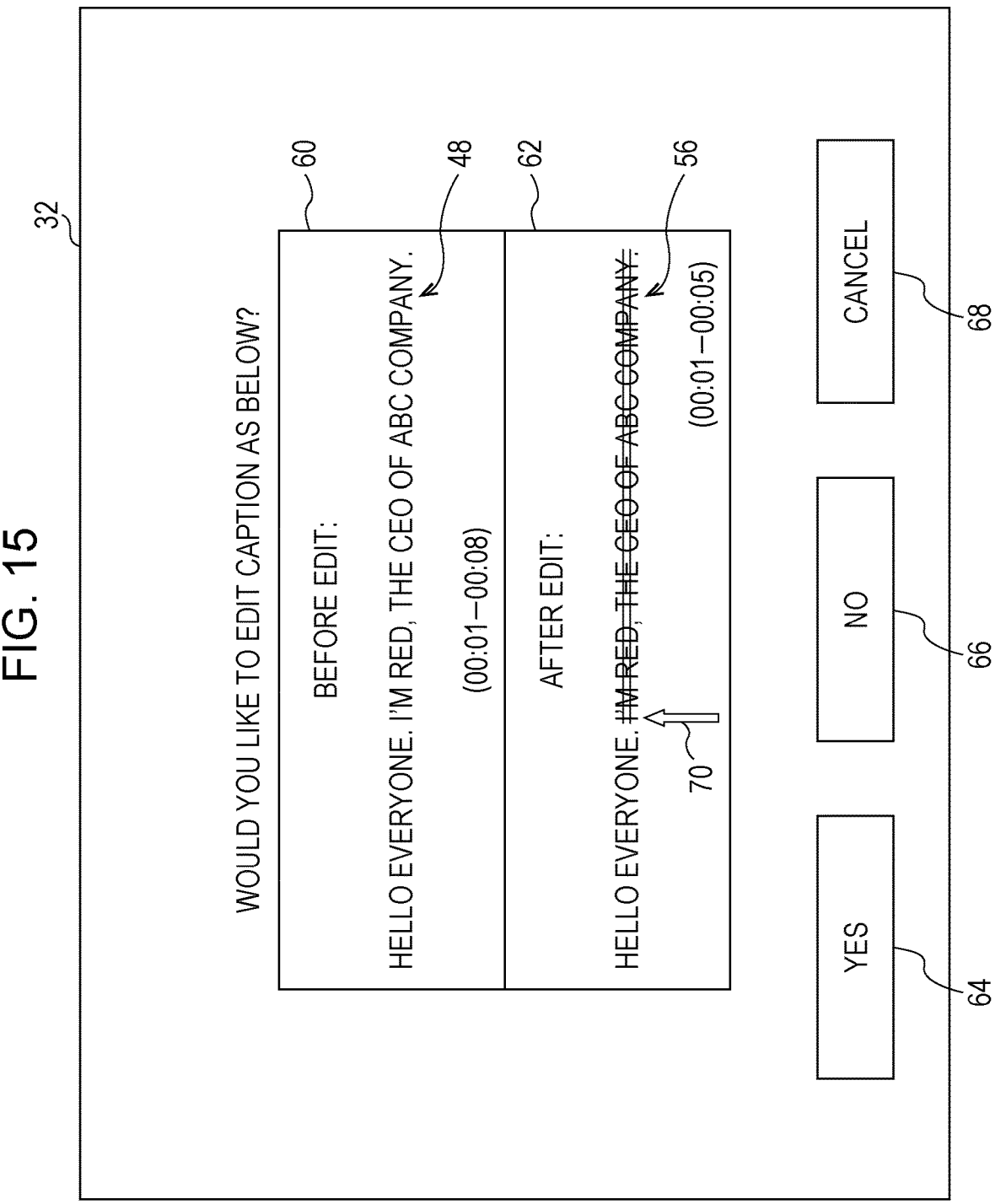

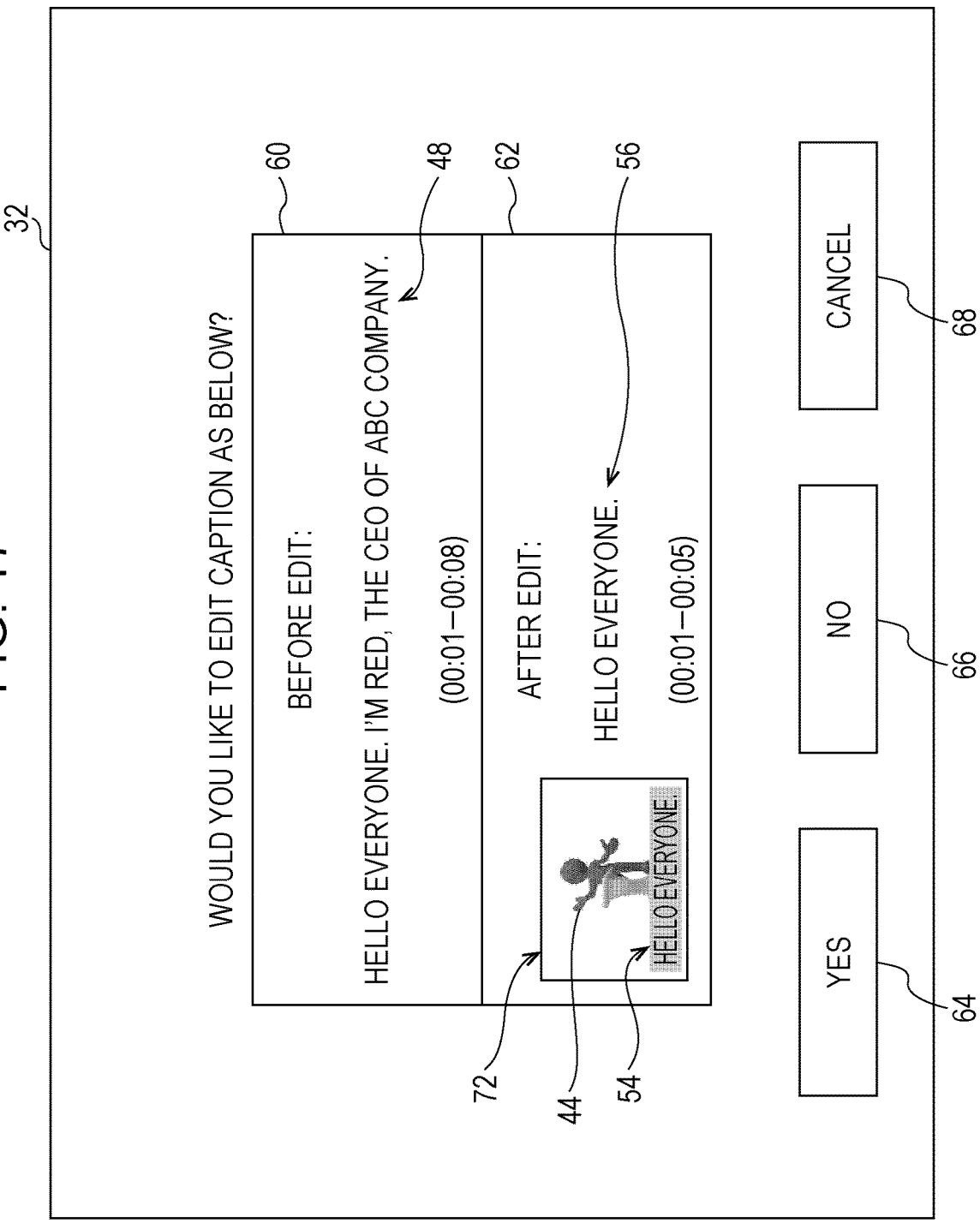

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-137621 filed Aug. 17, 2020.

BACKGROUND

(i) Technical Field

The present disclosure relates to an information processing apparatus and a non-transitory computer readable medium.

(ii) Related Art

Japanese Patent No. 5676087 describes a technology relating to improved trick-mode playback, and more particularly to display of captioned information during trick-mode playback of a video presentation.

In the related art, there is an apparatus that performs video editing and that is configured to, for example, only remove an image included in a section of the playback time of a video, the section being specified to be removed, so that a caption superimposed on the removed image remain in an edited video. Consequently, in an editing operation using the apparatus of the related art, in addition to an operation of removing an image included in a section of the playback time of a video, the section being specified to be removed, it is necessary to perform an operation of removing a caption superimposed on the image in the section to be removed.

SUMMARY

Aspects of non-limiting embodiments of the present disclosure relate to reducing the number of steps it takes a user to remove a caption in video editing compared with the case where it is necessary to perform an operation of removing a caption from a video separately from an operation of removing an image from the video.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to acquire video data that enables playback of a video in which audio, an image, and a caption are chronologically synchronized, receive a section of a playback time of the video, the section being to be removed, and remove a partial caption that corresponds to the audio in the received section and that is at least a portion of the caption from the image in the received section.

BRIEF DESCRIPTION OF THE DRAWINGS

Exemplary embodiments of the present disclosure will be described in detail based on the following figures, wherein:

FIG. 14 is a diagram illustrating an example of a confirmation screen in a second exemplary embodiment;

FIG. 15 is a diagram illustrating an example of a confirmation screen in a third exemplary embodiment;

FIG. 17 is a diagram illustrating an example of a confirmation screen in a fourth exemplary embodiment.

DETAILED DESCRIPTION

An information processing apparatus 10 according to exemplary embodiments will be described below.

First Exemplary Embodiment

The information processing apparatus 10 is a computer capable of performing processing for editing a video in which audio, an image, and a caption are chronologically synchronized. As an example, a server computer, a general-purpose computer device such as a personal computer (PC), a portable computer device such as a smartphone or a tablet terminal, or the like is applied to the information processing apparatus 10.

Note that, in the following description, "removal" of audio, an image, a caption, or the like refers to processing for making audio, an image, a caption, or the like that is to be removed from a played-back video inaudible or invisible to a user. Thus, the term "remove" includes deleting data containing audio, an image, a caption, or the like to be removed and discontinuing output of audio to be removed or display of an image, a caption, or the like to be removed instead of deleting data containing the audio, the image, the caption, or the like.

A hardware configuration of the information processing apparatus 10 will now be described.

Figure 1:
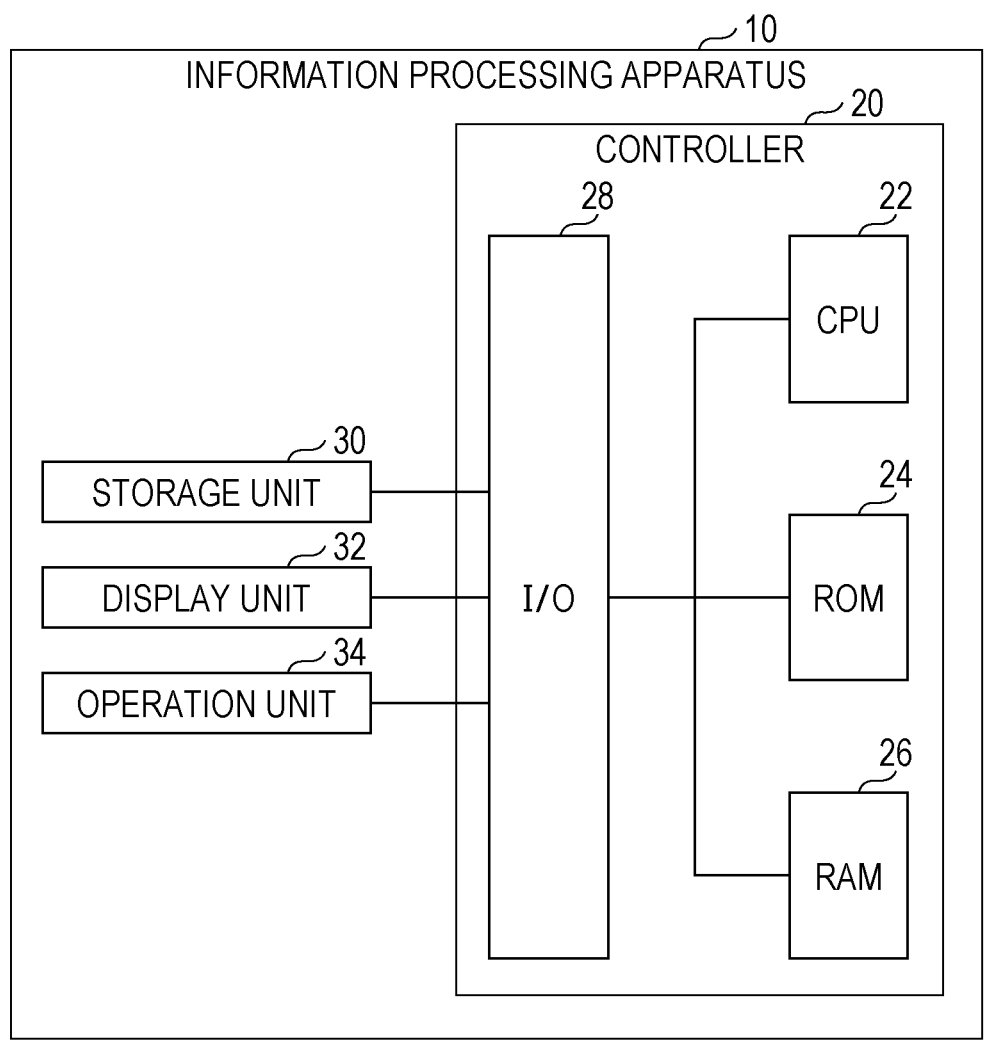
FIG. 1 is a block diagram illustrating a hardware configuration of an information processing apparatus.

FIG. 1 is a block diagram illustrating the hardware configuration of the information processing apparatus 10.

As illustrated in FIG. 1, the information processing apparatus 10 includes a controller 20 that controls the operation of the information processing apparatus 10. In the controller 20, a central processing unit (CPU) 22, a read only memory (ROM) 24, a random access memory (RAM) 26, and an input/output (I/O) interface 28 are connected to one another via a bus so as to be capable of communicating with one another.

The CPU 22 is a central processing unit and runs various programs and controls each unit. In other words, the CPU 22 reads a program from the ROM 24 and runs the program by using the RAM 26 as a work area. The CPU 22 performs control of the above-mentioned components and various arithmetic processing operations in accordance with the programs recorded in the ROM 24.

The ROM 24 stores various programs and various data items. The various programs include an information processing program for causing the information processing apparatus 10 to perform video editing processing. Note that the information processing program may be installed beforehand in the information processing apparatus 10 or may be suitably installed in the information processing apparatus 10 by being stored in a non-volatile storage medium or by being distributed via a network. Conceivable examples of the non-volatile storage medium include a CD-ROM, a magneto-optical disk, a hard disk drive (HDD), a DVD-ROM, a flash memory, and a memory card.

The RAM 26 serves as a work area and temporarily stores a program or data.

A storage unit 30, a display unit 32, and an operation unit 34 are connected to the I/O interface 28.

As the storage unit 30, for example, an HDD, a solid state drive (SSD), a flash memory, or the like is used.

The storage unit 30 stores video data that enables playback of a video in which audio components, images, and captions are chronologically synchronized. The video data is a file in a video format, and for example, MP4 format, AVI format, or the like is used as the file format.

The video data includes audio data for outputting the audio components, image data for displaying the images, and caption data for displaying the captions. The audio data is a file in an audio format, and for example, AAC format, MP3 format, or the like is used as the file format. The image data is a file in an image format, and for example, JPEG format or PNG format is used as the file format. The caption data is written in, for example, TTML format, WebVTT format, or the like.

The video data further includes time data storing the playback time of the video. In order to chronologically synchronize the audio components, the images, and the captions of the video, time data contains data items including start and end positions of output of each audio component, start and end positions of display of each image, and start and end positions of display of each caption.

For example, a liquid crystal display (LCD), an electro luminescence (EL) display, or the like is used as the display unit 32. The display unit 32 integrally includes a touch panel.

The operation unit 34 receives various instructions from a user who uses the information processing apparatus 10. The display unit 32 displays various information items such as a result of processing that is performed in accordance with an instruction received from a user and notifications for the processing.

Video editing processing that is performed by the information processing apparatus 10 will now be described with reference to FIG. 2 to FIG. 13.

Figure 2:
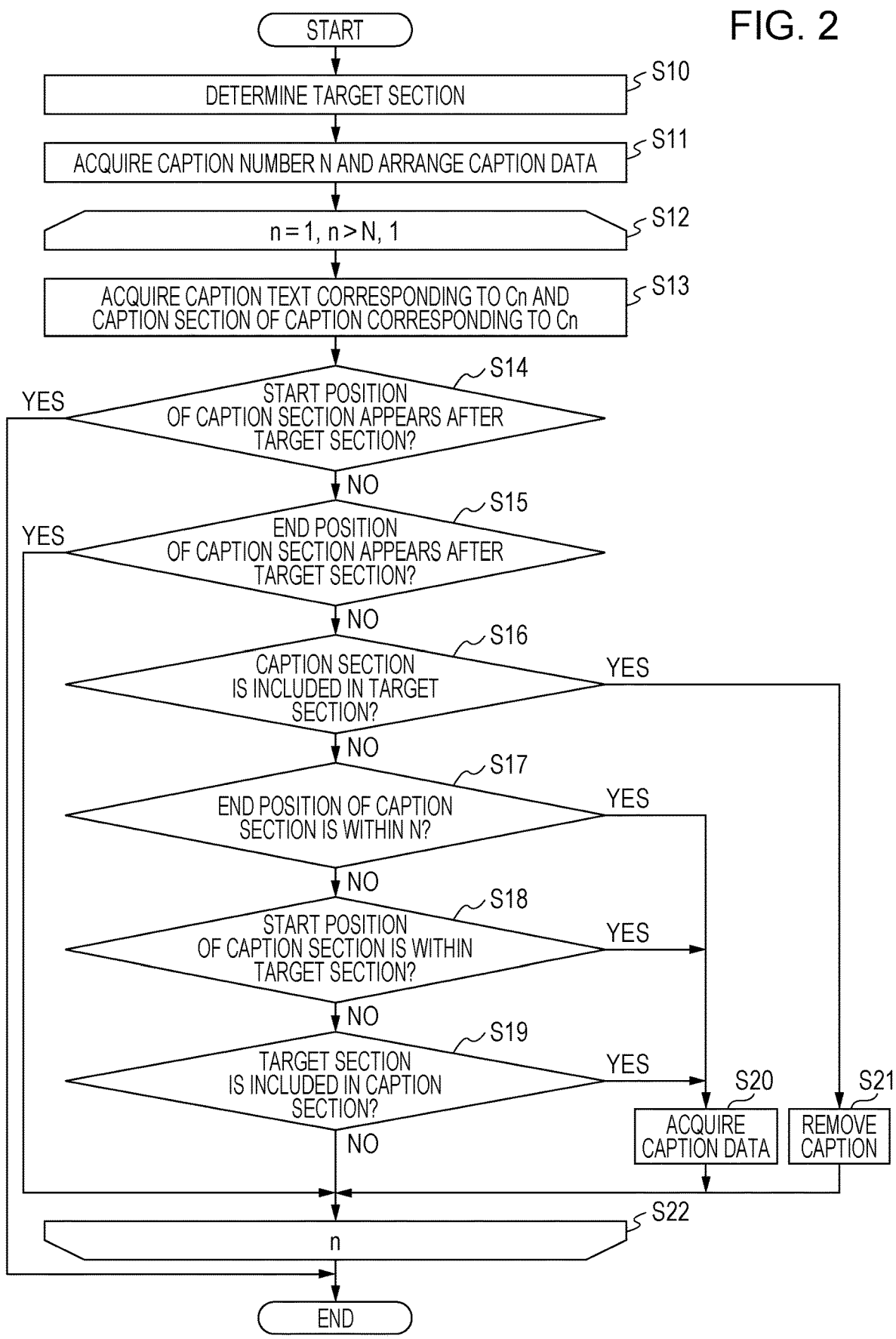
FIG. 2 is a flowchart illustrating a flow of caption processing.

FIG. 2 is a flowchart illustrating a flow of caption processing for acquiring caption data or removing a caption.

In step S10 illustrated in FIG. 2, the CPU 22 acquires, from the storage unit 30, video data containing a video to be edited (hereinafter referred to as "unedited video") on the basis of an operation performed on the operation unit 34 by a user and then sets a section of the playback time of the unedited video that is to be removed as a target section. For example, the CPU 22 acquires the playback time of the unedited video from the time data and receives input of the start and end positions of the target section within the acquired playback time. Then, the process continues to step S11. Note that the CPU 22 may receive the start and end positions in the following manner. For example, the CPU 22 causes the display unit 32 to display a linear graphic representing the playback time from the start to the end as a linear segment and receives, from a user, an input of the start and end positions of the target section in the total length of the linear graphic.

In step S11, the CPU 22 acquires, by referencing to the time data relating to the unedited video, the number of caption sections each of which is a section between a start position where display of a caption is started and an end position where display of the caption is ended as a caption number N (N is a variable). In addition, the CPU 22 stores the value of the variable N into Cn (n is a variable) that indicates the n-th caption. When the value of the variable N is 2 or greater, the caption data items each corresponding to Cn are arranged in chronological order starting from the caption section having the earliest start position. Then, the process continues to step S12.

Next, the CPU 22 starts a loop in which the control operations in step S12 to step S22 are repeatedly performed.

When the operation in step S12 is performed for the first time, the CPU 22 sets an initial value of the variable n, a termination condition of the loop, and an increment value of the variable n. For example, the CPU 22 sets the initial value of the variable n, the termination condition of the loop, and the increment value of the variable n to "1", "n>N", and "1", respectively.

When the operation in step S12 is performed for the second and subsequent times, the CPU 22 adds the incremental value to the variable n and then determines whether the termination condition of the loop is satisfied. When the CPU 22 determines that the termination condition of the loop is satisfied, the loop is exited, and the process is terminated. When the CPU 22 determines that the termination condition of the loop is not satisfied, the loop is continued, and the process proceeds to step S13.

In step S13, the CPU 22 acquires caption text, which is the text of a caption, from the caption data corresponding to Cn and acquires the caption section of the caption represented by the caption data from the time data. Then, the process continues to step S14.

In step S14, the CPU 22 determines whether the start position of the caption section appears after the target section on the timeline of the video, and if the CPU 22 determines that the start position appears after the target section on the timeline (YES in step S14), the loop is exited, and the process is terminated. In contrast, if the CPU 22 determines that the start position does not appear after the target section on the timeline (NO in step S14), the process continues to step S15.

In step S15, the CPU 22 determines whether the end position of the caption section appears before the target section on the timeline of the video, and if the CPU 22 determines that the end position appears before the target section on the timeline (YES in step S15), the process continues to step S22. In contrast, if the CPU 22 determines that the end position does not appear before the target section on the timeline (NO in step S15), the process continues to step S16.

In step S16, the CPU 22 determines whether the caption section is included in the target section, and if the CPU 22 determines that the caption section is included in the target section (YES in step S16), the process continues to step S21. In contrast, if the CPU 22 determines that the caption section is not included in the target section (NO in step S16), the process continues to step S17.

In step S17, the CPU 22 determines whether the end position of the caption section is within the target section, and if the CPU 22 determines that the end position of the caption section is within the target section (YES in step S17), the process continues to step S20. In contrast, if the CPU 22 determines that the end position of the caption section is not within the target section (NO in step S17), the process continues to step S18.

In step S18, the CPU 22 determines whether the start position of the caption section is within the target section, and if the CPU 22 determines that the start position of the caption section is within the target section (YES in step S18), the process continues to step S20. In contrast, if the CPU 22 determines that the start position of the caption section is not within the target section (NO in step S18), the process continues to step S19.

In step S19, the CPU 22 determines whether the target section is included in the caption section, and if the CPU 22 determines that the target section is included in the caption section (YES in step S19), the process continues to step S20. In contrast, if the CPU 22 determines that the target section is not included in the caption section (NO in step S19), the process continues to step S22.

In step S20, the CPU 22 acquires the caption data corresponding to Cn from the video data. Then, the process continues to step S22.

In step S21, the CPU 22 removes the caption represented by the caption data corresponding to Cn. Then, the process continues to step S22.

In step S22, the CPU 22 performs loop-end processing such that the process proceeds to step S12, which is the first operation of the loop.

A specific example of caption processing will now be described with reference to FIG. 3A to FIG. 5.

Figure 3A:
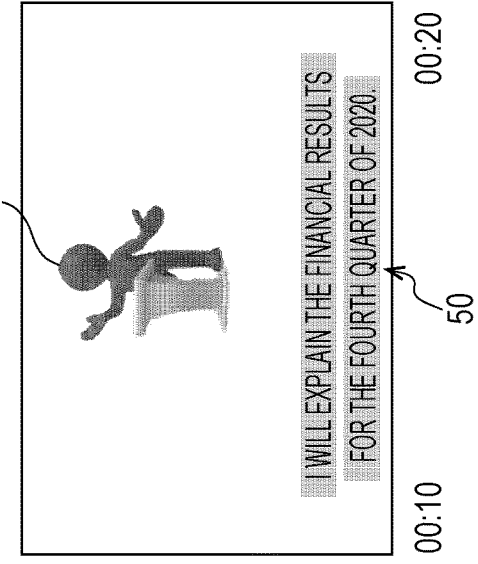
FIGS. 3A to 3C are diagrams illustrating an example of the state of an unedited video being played back.
Figure 3B:
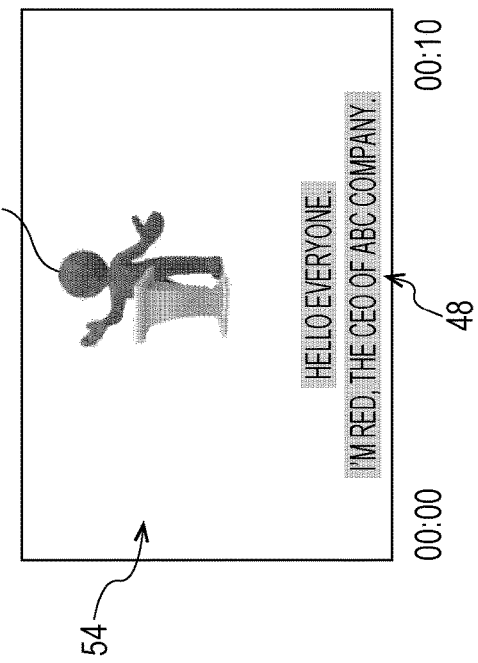
Figure 3C:
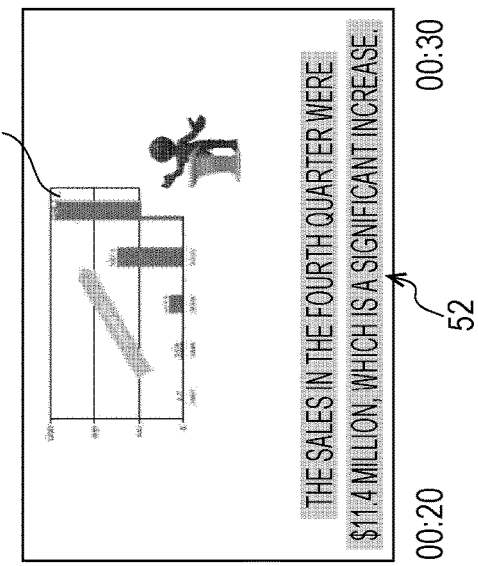

FIGS. 3A to 3C are diagrams illustrating the state of an unedited video being played back. The playback time of the unedited video is 30 seconds. The unedited video includes images including a first image 44 that is illustrated in FIG. 3A and FIG. 3B and a second image 46 that is illustrated in FIG. 3C, captions including a first caption 48 that is illustrated in FIG. 3A, a second caption 50 that is illustrated in FIG. 3B, and a third caption 52 that is illustrated in FIG. 3C, and audio components containing a speech that corresponds to the contents of the captions 48 to 52. The images 44 and 46, the captions 48, 50, 52, and the audio components are chronologically synchronized and sequentially played back, and as a result, the video is formed.

Figure 4:
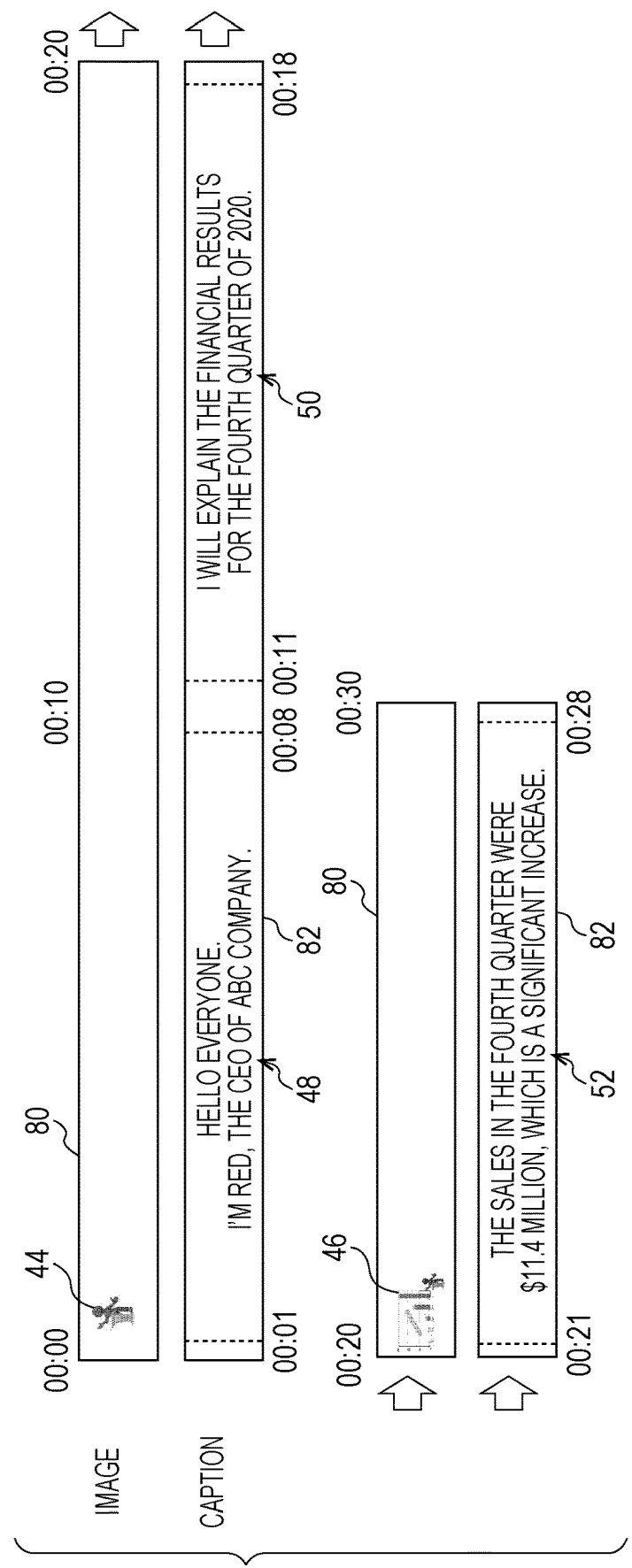
FIG. 4 is a diagram illustrating an example of an edit screen.

FIG. 4 is a diagram illustrating an example of an edit screen in the case of editing an unedited video displayed on the display unit 32.

A user operates the operation unit 34 so as to input an instruction to perform processing for editing the unedited video, and upon reception of the instruction, the CPU 22 causes the edit screen illustrated in FIG. 4 to be displayed.

On the edit screen illustrated in FIG. 4, an image bar 80 indicating information relating to each image included in the unedited video and a caption bar 82 indicating information relating to each caption included in the unedited video are displayed.

In the image bar 80, the images that are displayed during playback of the unedited video, particularly the first image 44 and the second image 46 are displayed. The duration of each image, that is, the length of time for displaying each image, in the playback time of the unedited video is displayed on the upper side of the image bar 80. For example, the duration of the first image 44 is set to a section "00:00 to 00:20 (seconds)" of the playback time of the unedited video, and the duration of the second image 46 is set to a section "00:20 to 00:30 (seconds)" of the playback time of the unedited video.

In the caption bar 82, the captions that are displayed during the playback of the unedited video, particularly the first caption 48, the second caption 50, and the third caption 52 are displayed. The caption section of each caption in the playback time of the unedited video is displayed on the lower side of the caption bar 82.

The caption section of the first caption 48 is set to a section "00:01 to 00:08 (seconds)" of the playback time of the unedited video. In this section, a character string "Hello everyone. I'm Red, the CEO of ABC company." is displayed together with the first image 44 (see FIG. 3A). The caption section of the second caption 50 is set to a section "00:11 to 00:18 (seconds)" of the playback time of the unedited video. In this section, a character string "I will explain the financial results for the fourth quarter of 2020." is displayed with the first image 44 (see FIG. 3B). The caption section of the third caption 52 is set to a section "00:21 to 00:28 (seconds)" of the playback time of the unedited video. In this section, a character string "The sales in the fourth quarter were $11.4 million, which is a significant increase." is displayed together with the second image 46 (see FIG. 3C).

Figure 5:
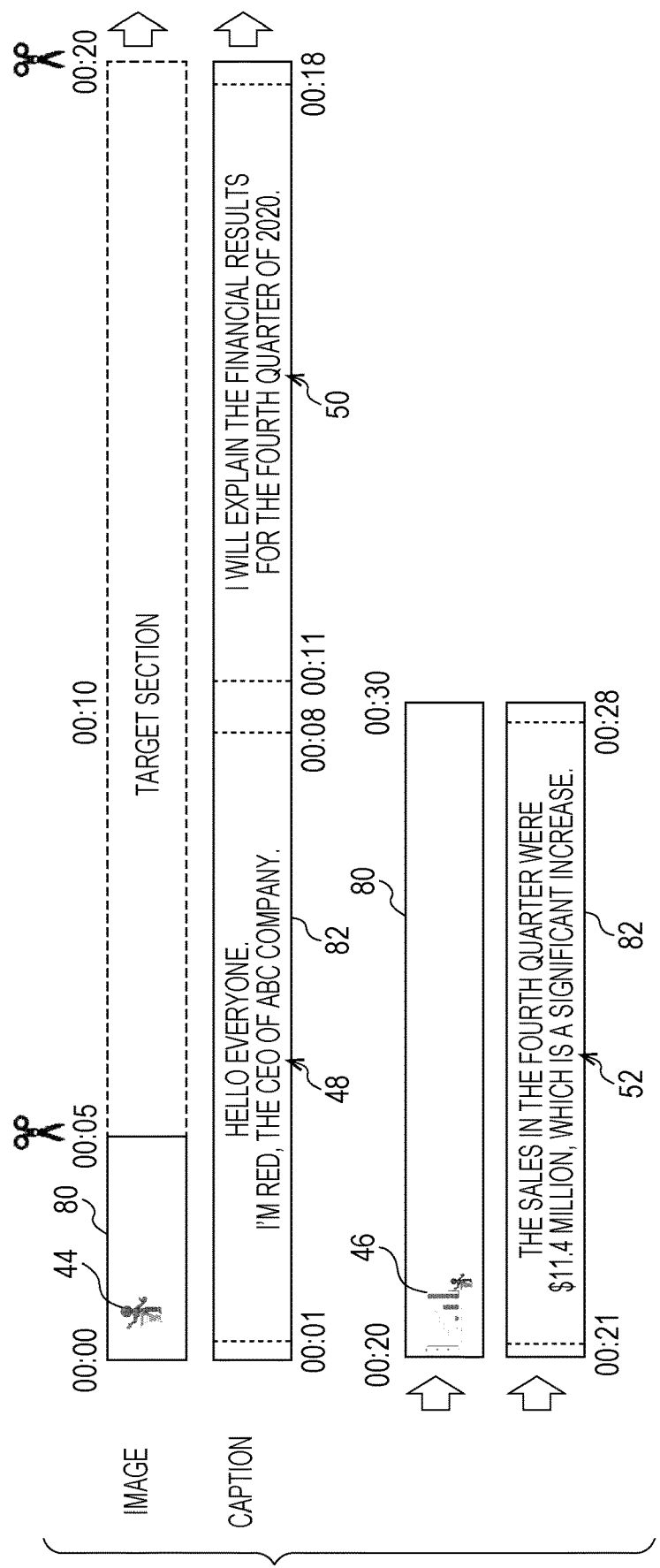
FIG. 5 is a diagram illustrating a section to be removed on the edit screen illustrated in FIG. 4.

FIG. 5 is a diagram illustrating a target section on the edit screen illustrated in FIG. 4.

In the edit screen illustrated in FIG. 5, when the target section is specified, the target section is indicated by a dashed line as illustrated in FIG. 5. In the case illustrated in FIG. 5, the target section is set to a section "00:05 to 00:20 (seconds)" of the playback time of the video as an example. Note that, for example, a time bar (not illustrated) that is a linear graphic representing the playback time of the video from the start to the end as a linear segment is displayed on the edit screen, which is displayed on the display unit 32, and a user specifies an arbitrary time range on the time bar, so that the start and end positions of the target section are set.

Note that, the image bar 80 and the caption bar 82 do not need to be displayed on the edit screen, and a user may specify the start and end position of the target section by, for example, manually inputting values, and the input from the user may be received.

Here, the end position of the caption section of the first caption 48 is within the target section, and the caption section of the second caption 50 is included in the target section. The caption section of the third caption 52 is not included in the target section, and the start position of the caption section of the third caption 52 appears after the target section on the timeline of the video. In this case, as the processing to be performed on the first caption 48, the CPU 22 acquires the caption data containing the first caption 48 from the video data in step S20, which is illustrated in FIG. 2 and performs partial-caption determination processing and confirmation-screen generation processing, which will be described later. In addition, as the processing to be performed on the second caption 50, the CPU 22 removes the second caption 50 in step S21 illustrated in FIG. 2. Furthermore, as the processing to be performed on the third caption 52, the CPU 22 does not acquire the caption data containing the third caption 52 or remove the third caption 52 in the flowchart illustrated in FIG. 2, and the process is terminated.

As a result, the second caption 50 is removed, and the third caption 52 is maintained in the current state. The flow of a process of removing a partial caption from a target image 54 (see FIG. 3A) that is an image to be removed and in which the first image 44 and the first caption 48 are displayed together in the target section will be described below with reference to FIG. 6 and the subsequent drawings.

Figure 6:
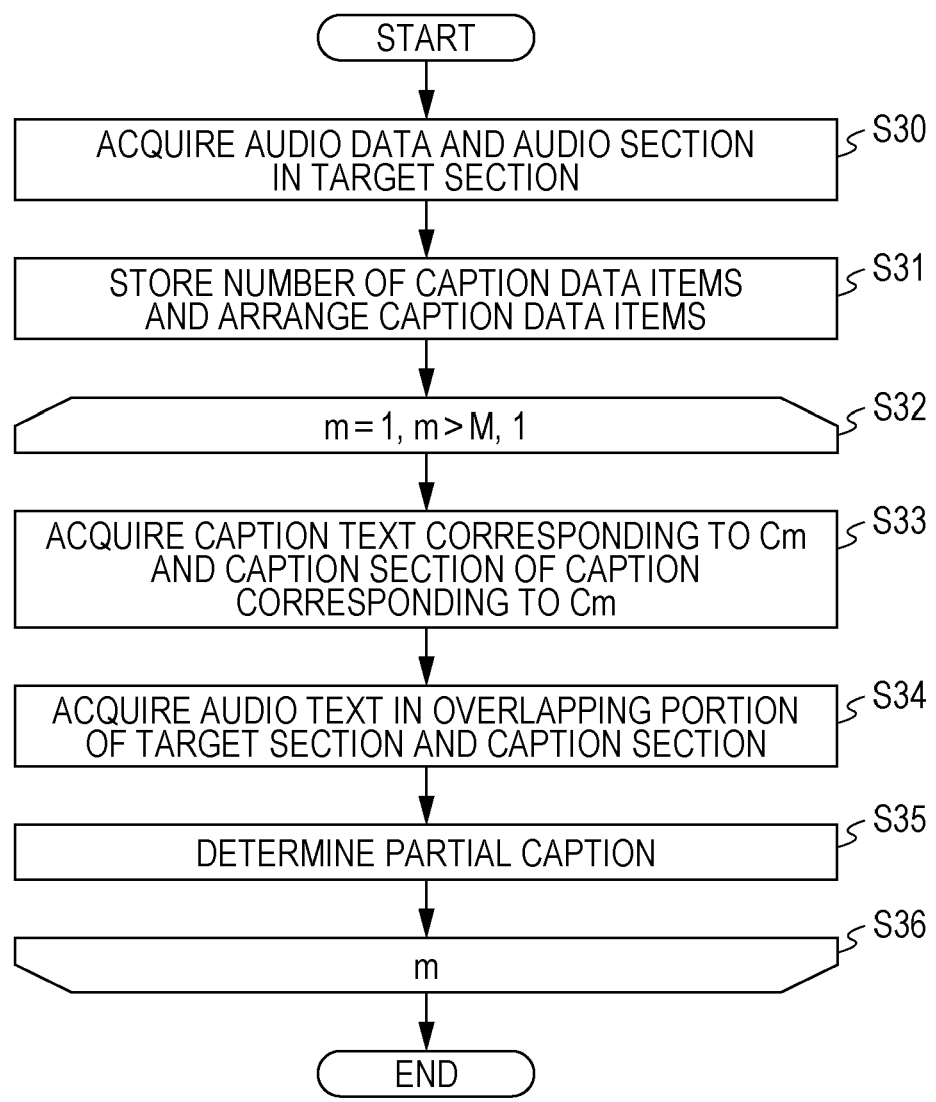
FIG. 6 is a flowchart illustrating a flow of partial-caption determination processing.

FIG. 6 is a flowchart illustrating a flow of the partial-caption determination processing for determining a partial caption that corresponds to the audio component to be output in the target section and that is at least a portion of the caption to be displayed in the target section.

In step S30 illustrated in FIG. 6, the CPU 22 acquires the audio data containing the audio component to be output in the target section from the video data and acquires an audio section that is a section between a start position of the output of the audio component and an end position of the output of the audio component from the time data. Then, the process continues to step S31.

In step S31, the CPU 22 stores the number of caption data items acquired in step S20 illustrated in FIG. 2 into a caption number M (M is a variable) that stores the number of caption data items, and when the value of the variable M is two or greater, the caption data items each corresponding to Cm (m is a variable) that indicates the m-th caption are arranged in chronological order starting from the caption section having the earliest start position. Then, the process continues to step S32.

Next, the CPU 22 starts a loop in which the control operations in step S32 to step S36 are repeatedly performed.

When the operation in step S32 is performed for the first time, the CPU 22 sets an initial value of the variable m, a termination condition of the loop, and an increment value of the variable m. For example, the CPU 22 sets the initial value of the variable m, the termination condition of the loop, and the increment value of the variable m to "1", "m>M", and "1", respectively.

When the operation in step S32 is performed for the second and subsequent times, the CPU 22 adds the incremental value to the variable m and then determines whether the termination condition of the loop is satisfied. When the CPU 22 determines that the termination condition of the loop is satisfied, the loop is exited, and the process is terminated. When the CPU 22 determines that the termination condition of the loop is not satisfied, the loop is continued, and the process proceeds to step S33.

In step S33, the CPU 22 acquires caption text from the caption data corresponding to Cm and acquires the caption section of the caption represented by the caption data from the time data. Then, the process continues to step S34.

In step S34, the CPU 22 acquires audio text that is obtained by converting an audio component in a portion in which the target section and the caption section overlap each other into text. The above-mentioned "caption section" is the caption section of the caption represented by the caption data corresponding to Cm. Here, the CPU 22 performs speech recognition processing by using a commonly known speech recognition technology so as to convert the audio data containing the audio component, which is a portion of a speech, into text. Then, the process continues to step S35.

Note that there are the following three types of time ranges on which the acquisition of audio text is performed in step S34.

(1) a time range from the start position to the end position of the target section when the target section is included in the caption section (2) a time range from the start position of the caption section to the end position of the target section when only the start position of the caption section is within the target section, and the end position of the caption section is outside of the target section (3) a time range from the start position of the target section to the end position of the caption section when only the end position of the caption section is within the target section, and the start position of the caption section is outside of the target section In step S35, the CPU 22 determines a partial caption that corresponds to the audio component to be output in the target section and that is at least a portion of the caption to be displayed in the target section.

Here, the case in which "a partial caption corresponds to an audio component" includes both the case where the audio text and the caption text match each other and the case where the audio text and the caption text are considered to match each other on the basis of a predetermined degree of similarity. An example of the above-mentioned degree of similarity is a degree of similarity of words, and when words contained in an audio component and words contained in a caption are compared, if the degree of similarity exceeds a predetermined threshold, they are determined to be similar to each other. For example, the degree of similarity may be set to exceed the predetermined threshold when the words contained in an audio component and the words contained in a caption evoke a similar meaning, and they may be determined to be similar to each other. When the CPU 22 determines, on the basis of the above-mentioned degree of similarity, that the audio text and the caption text are similar to each other, the audio text and the caption text are considered to match each other on the basis of the above-mentioned degree of similarity.

Examples of the case in which "a partial caption corresponds to an audio component" are as follows: the case where the audio text and the caption text are both "I'm Red, the CEO of ABC company.", the case where the audio text is "Hello everyone.", and the caption text is "Hello everybody.", and the case where the audio text is "I'm Red, the CEO of ABC company.", and the caption text is "I'm Red, the chief executive officer of ABC company.".

The partial caption in step S35 is a portion of the text of the caption that is displayed together with the image in the target section determined by comparing the caption text acquired in step S33 and the audio text acquired in step S34. Details of the flow of a process of determining a partial caption will be described later. The process continues to step S36.

In step S36, the CPU 22 performs loop-end processing such that the process proceeds to step S32, which is the first operation of the loop.

A specific example of the partial-caption determination processing will now be described with reference to FIG. 7 and FIG. 8.

Figure 7:
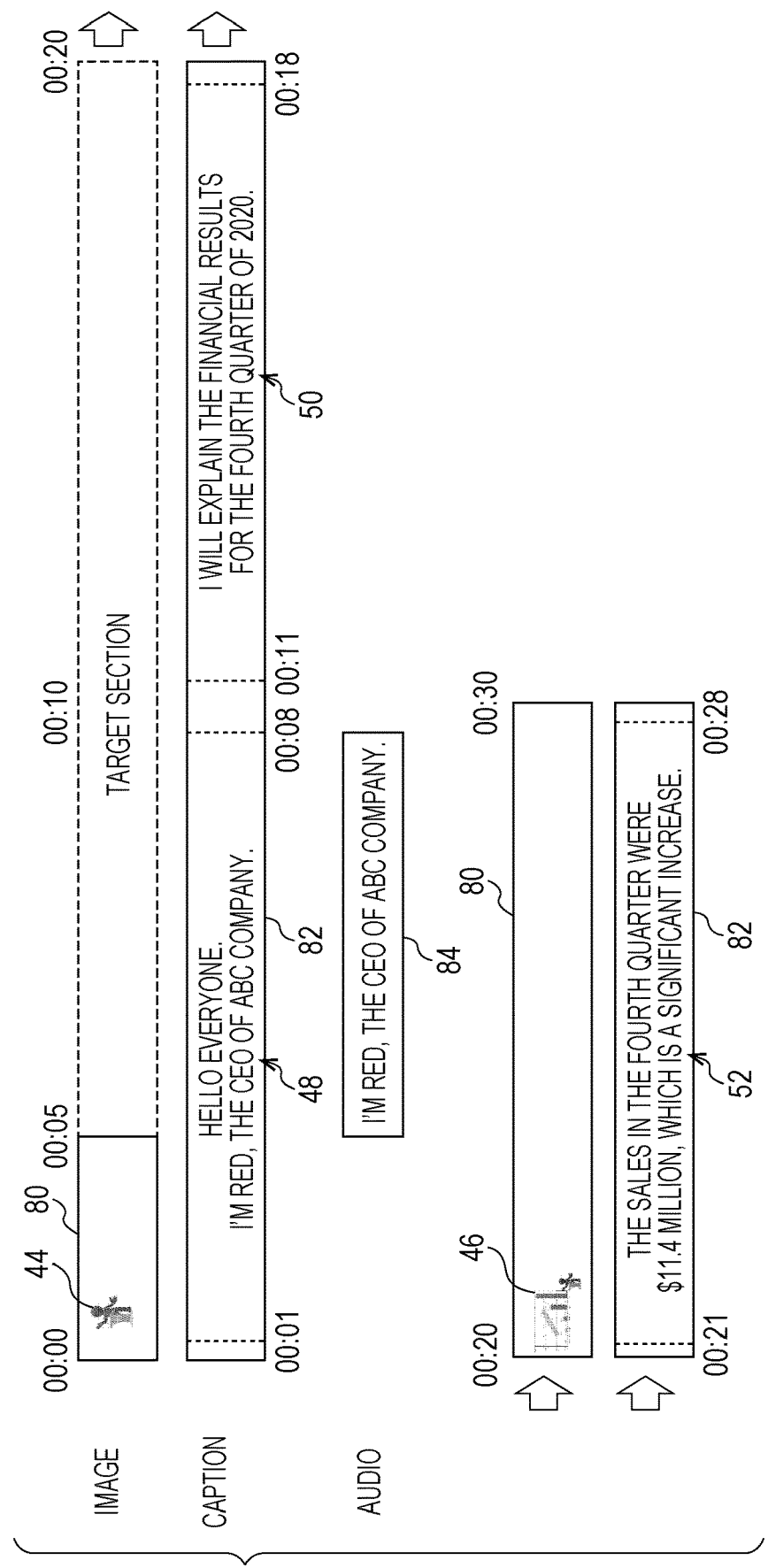
FIG. 7 is a diagram illustrating audio text on the edit screen illustrated in FIG. 5.

FIG. 7 is a diagram illustrating audio text on the edit screen illustrated in FIG. 5, the audio text being obtained by converting audio data containing an audio component in a portion in which the target section and the caption section of the first caption 48 overlap each other into text.

The edit screen illustrated in FIG. 7 further displays an audio bar 84 indicating information relating to each audio component contained in an unedited video.

The audio components of the unedited video contain a speech that corresponds to the contents of the first caption 48, the second caption 50, and the third caption 52. In the case illustrated in FIG. 7, the target section is set to a section "00:05 to 00:20 (seconds)", and the caption section of the first caption 48 is set to a section "00:01 to 00:08 (seconds)". In this case, in step S34 illustrated in FIG. 6, the CPU 22 acquires audio text in a time range from the start position of the target section to the end position of the caption section. Accordingly, in the audio bar 84 illustrated in FIG. 7, a character string "I'm Red, the CEO of ABC company." is displayed as the audio text in the time range from the start position of the target section to the end position of the caption section.

Figure 8:
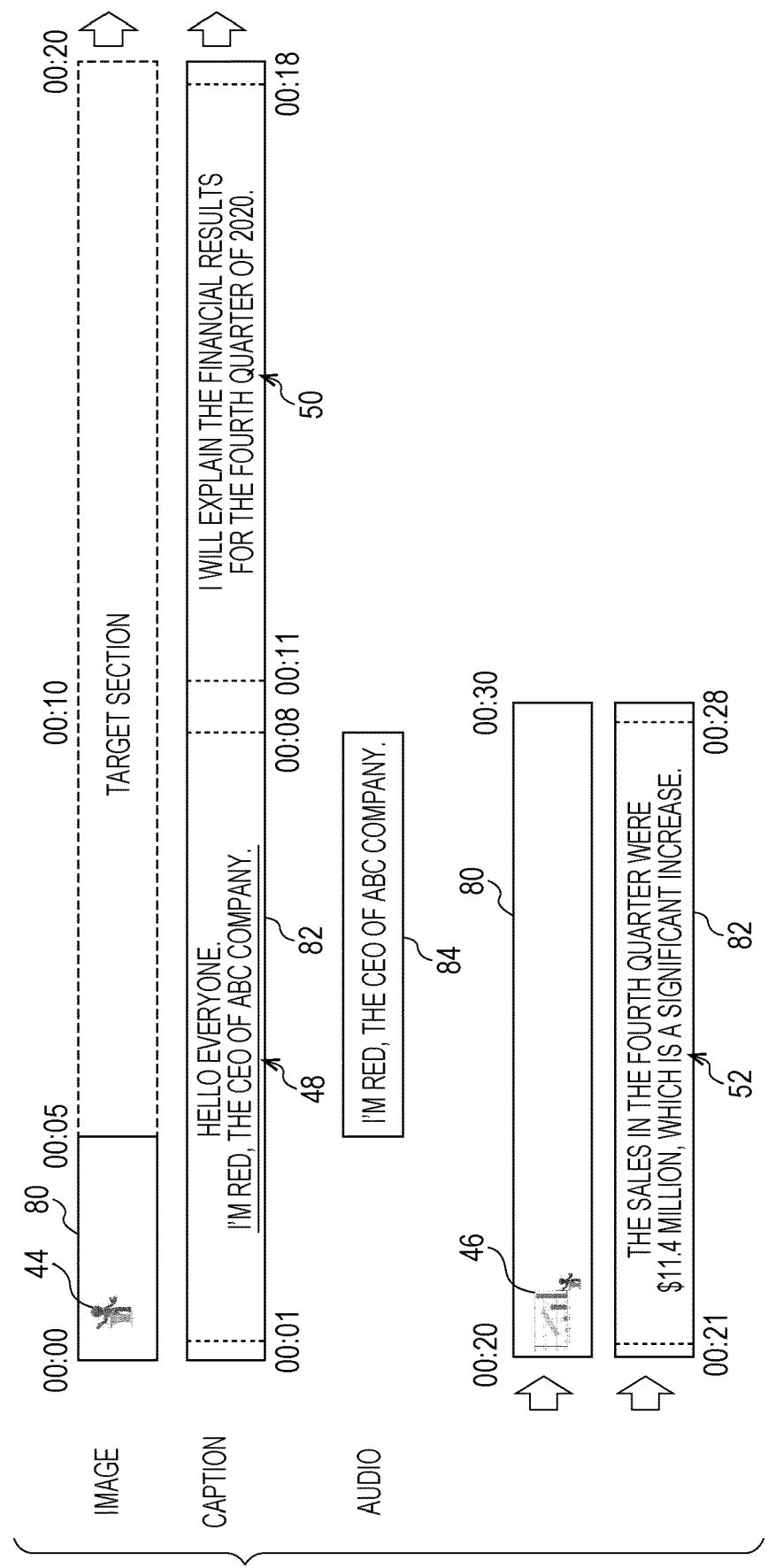
FIG. 8 is a diagram illustrating a determined partial caption on the edit screen illustrated in FIG. 7.

FIG. 8 is a diagram illustrating a determined partial caption on the edit screen illustrated in FIG. 7.

In FIG. 8, the CPU 22 compares the caption text of the first caption 48 and the audio text in a portion in which the target section and the caption section of the first caption 48 overlap each other, and as a result, in the caption bar 82, an underlined character string "I'm Red, the CEO of ABC company." that is a portion of the character string of the first caption 48 is determined to be a partial caption.

Figure 9:
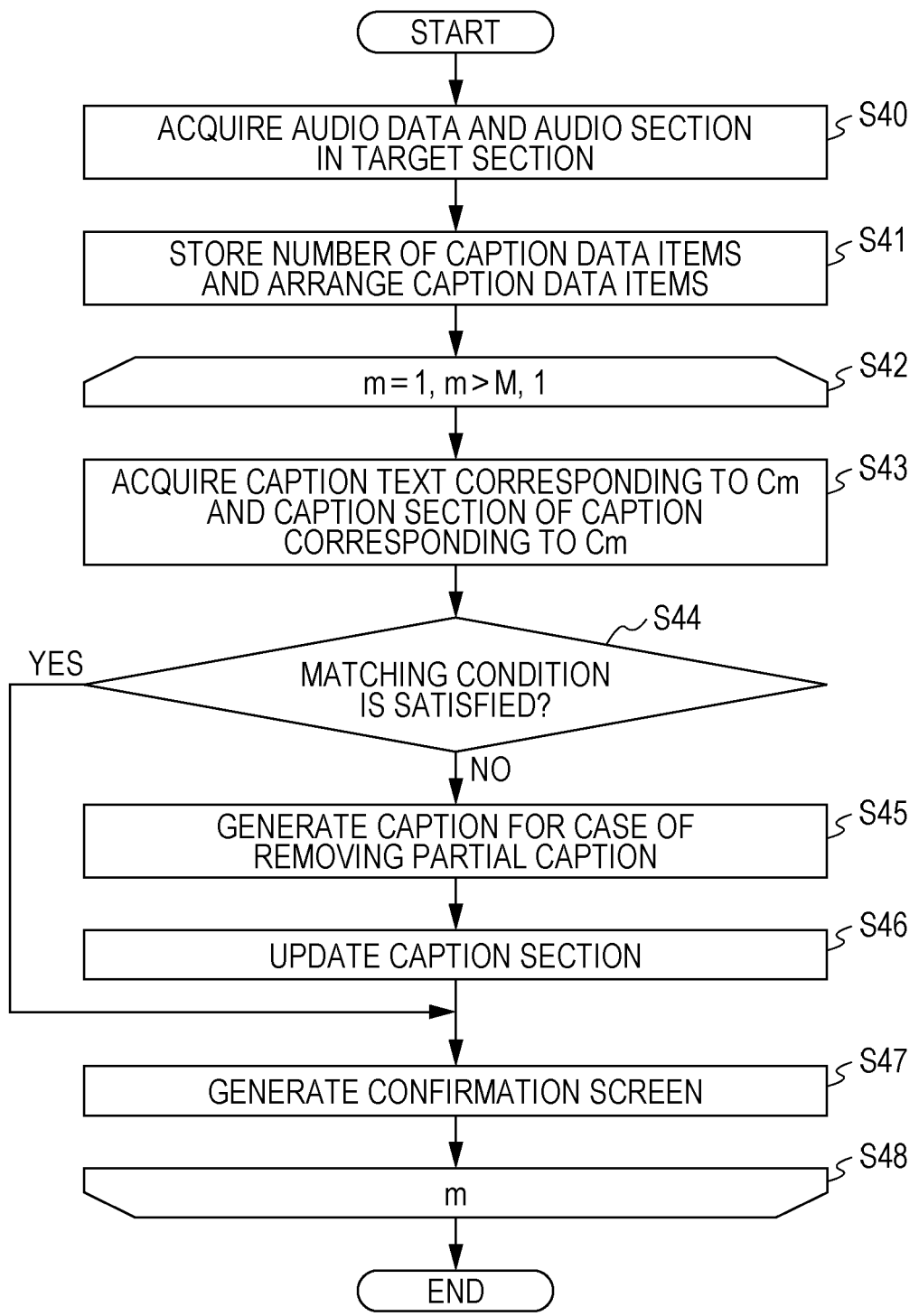
FIG. 9 is a flowchart illustrating a flow of confirmation-screen generation processing.

FIG. 9 is a flowchart illustrating a flow of the confirmation-screen generation processing for generating a confirmation screen for confirming removal of a caption.

In step S40 illustrated in FIG. 9, the CPU 22 acquires the audio data of the audio component to be output in the target section from the video data and acquires the audio section of the audio component from the time data. Then, the process continues to step S41.

In step S41, the CPU 22 stores the number of caption data items acquired in step S20 illustrated in FIG. 2 into the caption number M (M is a variable) that stores the number of caption data items, and when the value of the variable M is two or greater, the caption data items each corresponding to Cm (m is a variable) that indicates the m—the caption are arranged in chronological order starting from the caption section having the earliest start position. Then, the process continues to step S42.

Next, the CPU 22 starts a loop in which the control operations in step S42 to step S48 are repeatedly performed.

When the operation in step S42 is performed for the first time, the CPU 22 sets an initial value of the variable m, a termination condition of the loop, and an increment value of the variable m. For example, the CPU 22 sets the initial value of the variable m, the termination condition of the loop, and the increment value of the variable m to "1", "m>M", and "1", respectively.

When the operation in step S42 is performed for the second and subsequent times, the CPU 22 adds the incremental value to the variable m and then determines whether the termination condition of the loop is satisfied. When the CPU 22 determines that the termination condition of the loop is satisfied, the loop is exited, and the process is terminated. When the CPU 22 determines that the termination condition of the loop is not satisfied, the loop is continued, and the process proceeds to step S43.

In step S43, the CPU 22 acquires caption text from the caption data corresponding to Cm and acquires the caption section of the caption represented by the caption data from the time data. Then, the process continues to step S44.

In step S44, the CPU 22 determines whether a matching condition is satisfied between the caption text acquired in step S33 and the partial caption determined in step S35. When the CPU 22 determines that the matching condition is satisfied (YES in step S44), the process continues to step S47. In contrast, when the CPU 22 determines that the matching condition is not satisfied (NO in step S44), the process continues to step S45. As an example, when the above-mentioned caption text and the text data containing the partial caption match each other, the CPU 22 determines that the matching condition is satisfied. For example, in the case where the above-mentioned caption text and the partial caption are both "I'm Red, the CEO of ABC company.", the CPU 22 determines that the matching condition is satisfied. In contrast, in the case where the above-mentioned caption text is "Hello everyone. I'm Red, the CEO of ABC company.", and the partial caption is "I'm Red, the CEO of ABC company.", the CPU 22 determines that the matching condition is not satisfied.

In step S45, the CPU 22 generates a caption that may be generated in the case where the partial caption is removed. For example, when the caption displayed together with an image in the target section is "Hello everyone. I'm Red, the CEO of ABC company.", and the partial caption is "I'm Red, the CEO of ABC company.", the CPU 22 generates caption text "Hello everyone." as the caption that may be generated in the case where the partial caption is removed. Then, the process continues to step S46.

In step S46, the CPU 22 updates at least one of the start position and the end position of the caption section containing the caption to be removed. Then, the process continues to step S47.

Note that update of a caption section in step S46 has the following three patterns.

(1) When the target section is included in the caption section, the start position of the caption section is not changed by the update, and the end position of the caption section is changed by the update in such a manner that the total time of the caption section is reduced by the time of the target section.

(2) When only the start position of the caption section is within the target section, and the end position of the caption section is outside of the target section, the start position of the caption section is changed by the update in such a manner that the total time of the caption section is reduced by the time of a portion in which the target section and the caption section overlap each other, and the end position of the caption section is not changed by the update.

(3) when only the end position of the caption section is within the target section, and the start position of the caption section is outside of the target section, the start position of the caption section is not changed by the update, and the end position of the caption section is changed by the update in such a manner that the total time of the caption section is reduced by the time of a portion in which the target section and the caption section overlap each other.

In step S47, the CPU 22 generates a confirmation screen for confirming removal of a caption. Then, the process continues to step S48. Note that details of the confirmation screen will be described later.

In step S48, the CPU 22 performs loop-end processing such that the process proceeds to step S42, which is the first operation of the loop.

A specific example of the confirmation-screen generation processing will now be described with reference to FIG. 10 and FIG. 11.

Figure 10:
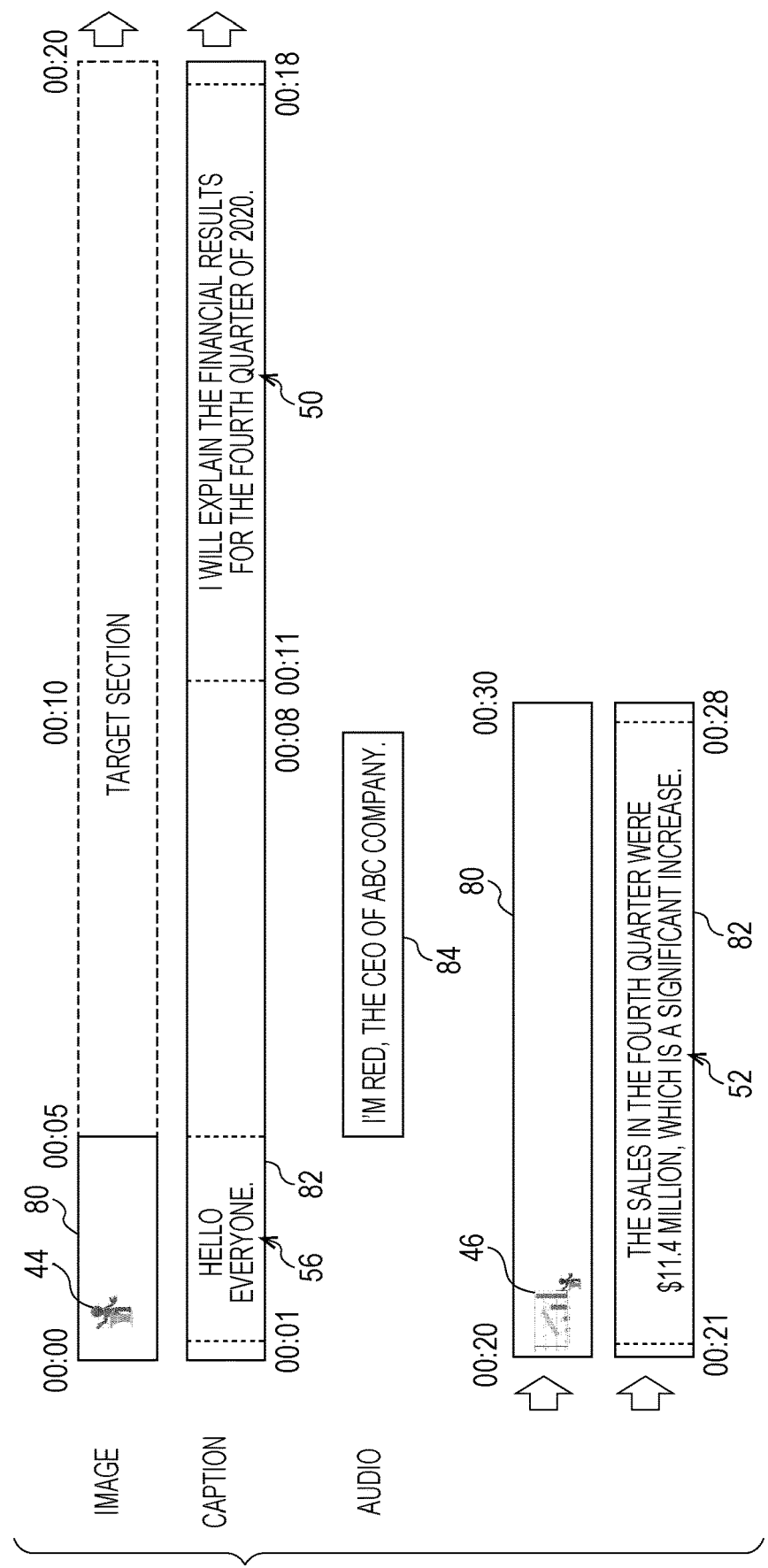
FIG. 10 is a diagram illustrating an edited caption on the edit screen illustrated in FIG. 8.

FIG. 10 is a diagram illustrating an edited caption 56 that is obtained by removing a partial caption from the target image 54 on the edit screen illustrated in FIG. 8.

In FIG. 10, a character string displayed in the caption bar 82 is changed from that illustrated in FIG. 8, and the edited caption 56 is "Hello everyone." that is obtained by removing the partial caption "I'm Red, the CEO of ABC company.", which is a portion of the first caption 48 "Hello everyone. I'm Red, the CEO of ABC company." displayed together with the first image 44 in the target section.

Figure 11:
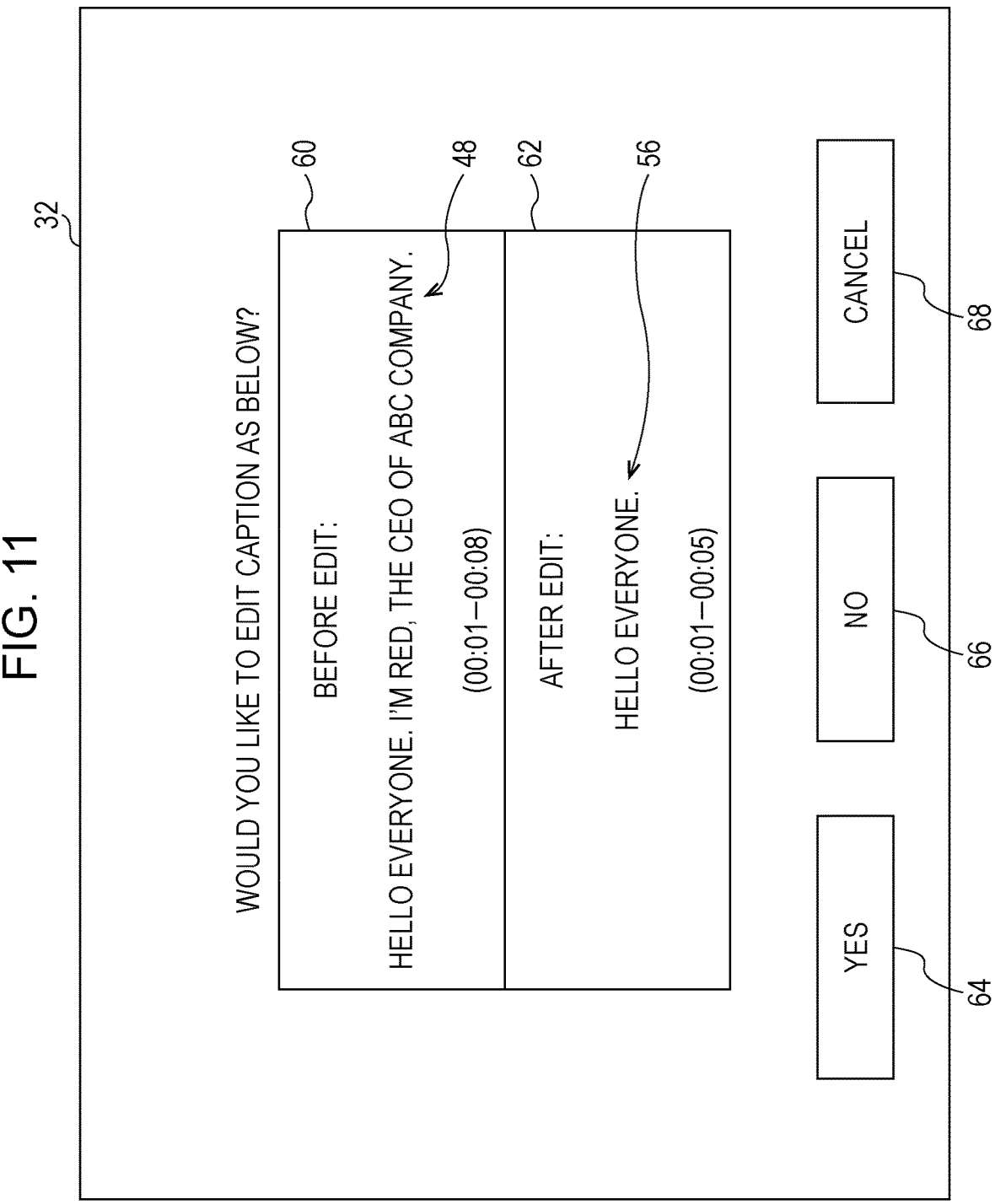
FIG. 11 is a diagram illustrating an example of a confirmation screen in a first exemplary embodiment.

FIG. 11 is a diagram illustrating an example of the confirmation screen in the first exemplary embodiment.

As illustrated in FIG. 11, the confirmation screen displayed on the display unit 32 includes unedited information 60, edited information 62, a YES button 64, a NO button 66, and a CANCEL button 68. The unedited information 60 contains the character string and the caption section of the first caption 48, and the edited information 62 contains the character string and the caption section of the edited caption 56.

Here, when the YES button 64 is operated, the partial caption is removed from the target image 54. The caption to be displayed together with the first image 44 is changed to the edited caption 56, and the contents of the image and audio are changed to what may be obtained by removing the target section. In the above-described case, in response to the YES button 64 being operated, the CPU 22 updates the time data relating to the unedited video to the contents that may be obtained by removing the target section and removes the image in the target section, so that the duration of the first image 44 and the duration of the second image 46 are changed. As a result of removing the partial caption, the caption to be displayed together with the first image 44 is changed to the edited caption 56, and as a result of removing the audio component in the target section, output of the audio component is discontinued.

As described above, in the first exemplary embodiment, the CPU 22 displays the edited caption 56 on the confirmation screen before the partial caption is removed from the target image 54.

In addition, in the first exemplary embodiment, the CPU 22 displays the caption before the partial caption is removed (the first caption 48 in the above-described case) along with the edited caption 56 on the confirmation screen.

Note that, on the confirmation screen illustrated in FIG. 11, although the unedited information 60 and the edited information 62 are displayed together, information that is obtained by reflecting an edit history in the unedited information 60 may be displayed. An edit history is reflected in the unedited information 60 by, for example, displaying a double line through a portion of a character string "Hello everyone. I'm Red, the CEO of ABC company.", the portion being the character string "I'm Red, the CEO of ABC company." in FIG. 15 and being the character string "everyone. I'm Red, the CEO of ABC company." in FIG. 16 (described later).

Figure 12:
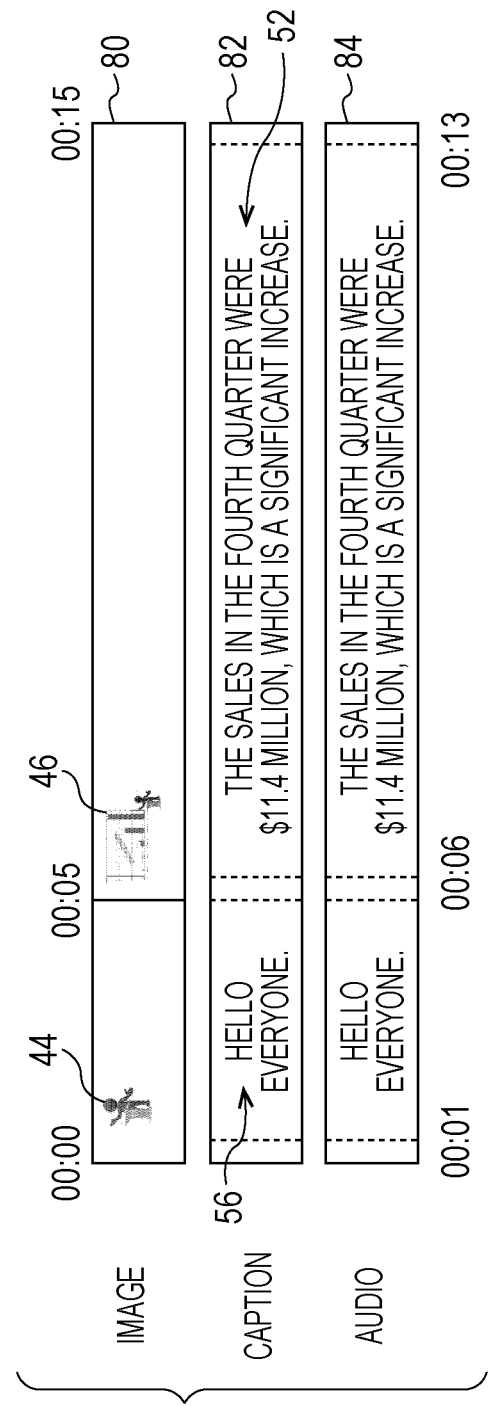
FIG. 12 is a diagram illustrating an example of an edit screen that is displayed after a YES button has been operated.

FIG. 12 is a diagram illustrating an example of an edit screen that is displayed after the YES button 64 has been operated.

As illustrated in FIG. 12, after the YES button 64 has been operated, the duration of the first image 44 is changed to a section "00:00 to 00:05 (seconds)", and the duration of the second image 46 is changed to a section "00:05 to 00:15 (seconds)". In addition, after the YES button 64 has been operated, a section "00:01 to 00:05 (seconds)" is the caption section of the edited caption 56 and the audio section of an audio component containing a speech that corresponds to the contents of the edited caption 56, and a section "00:06 to 00:13 (seconds)" is the caption section of the third caption 52 and the audio section of an audio component containing a speech that corresponds to the contents of the third caption 52.

Note that, on the confirmation screen illustrated in FIG. 11, when the NO button 66 is operated, the partial caption is not removed from the target image 54, and the caption to be displayed together with the first image 44 remains to be the first caption 48, whereas the contents of the image and audio are changed to what may be obtained by removing the target section. When the CANCEL button 68 is operated, the series of video editing processing operations are canceled.

Figure 13B:
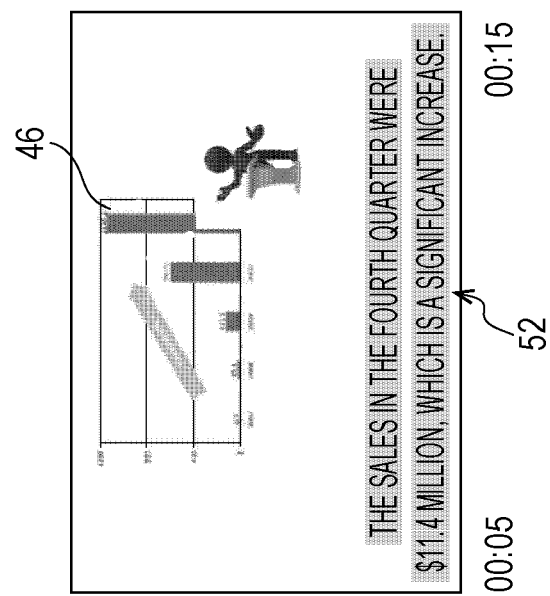
FIGS. 13A and 13B are diagrams illustrating an example of a configuration of an edited video.
Figure 13A:
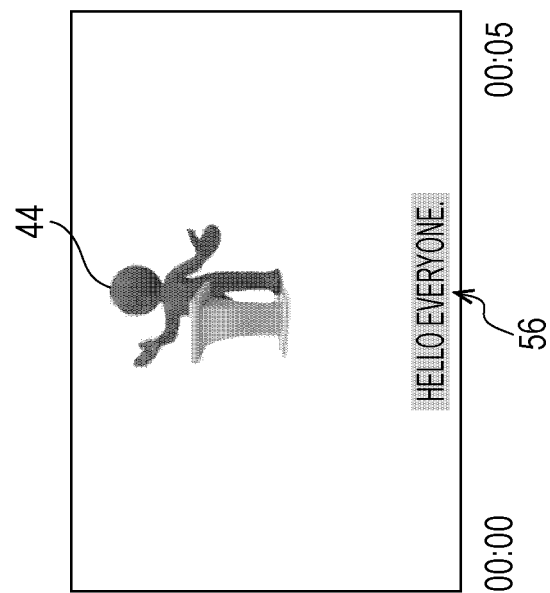

FIGS. 13A and 13B are diagrams illustrating the state of a video that has been edited (hereinafter referred to as "edited video") being played back. The playback time of the edited video is shortened to 15 seconds along with the removal of the target section. In the edited video, the partial caption is removed from the target image 54 illustrated in FIG. 3A along with the removal of the target section, and the caption to be displayed together with the first image 44 is changed to the edited caption 56 as illustrated in FIG. 13A. In addition, in the edited video, the caption section of the second caption 50 illustrated in FIG. 3B is removed from the playback time of the video along with the removal of the target section, and as illustrated in FIG. 13B, the caption section of the third caption 52 is changed from that in the unedited video illustrated in FIG. 3C.

In the related art, there is an apparatus that performs video editing and that is configured to, for example, only remove an image included in a section of the playback time of a video, the section being specified to be removed, so that a caption superimposed on the removed image remain in an edited video. Consequently, in an editing operation using the apparatus of the related art, in addition to an operation of removing an image included in a section of the playback time of a video, the section being specified to be removed, it is necessary to perform an operation of removing a caption superimposed on the image in the section to be removed.

In contrast, in the first exemplary embodiment, the CPU 22 acquires video data, receives a target section that is to be removed from the playback time of a video based on the acquired video data, and removes a partial caption in the received target section from the target image 54. In the first exemplary embodiment employing the above-described configuration, by receiving a target section, removal of an image in the target section and removal of a caption in the target section are performed.

In the manner described above, according to the first exemplary embodiment, the number of steps it takes a user to remove a caption in video editing is reduced compared with the case where it is necessary to perform an operation of removing a caption from a video separately from an operation of removing an image from the video.

In the first exemplary embodiment, although the CPU 22 displays the edited caption 56 on the confirmation screen before removing a partial caption from the target image 54, the present disclosure is not limited to this configuration, and the partial caption may be removed from the target image 54 on the basis of a received target section without displaying the edited caption 56.

In the first exemplary embodiment, although the CPU 22 displays the caption from which the partial caption has not yet been removed along with the edited caption 56 on the confirmation screen, the present disclosure is not limited to this configuration, and it is not necessary to display the caption from which the partial caption has not yet been removed.

The file formats for video data, audio data, image data, and caption data that have been mentioned in the first exemplary embodiment are examples, and other file formats may be used.

In the first exemplary embodiment, in step S34 illustrated in FIG. 6, the CPU 22 acquires audio text that is obtained by transcribing an audio component into text, the audio component being contained in a portion in which the target section and the caption section of a caption that is represented by the caption data corresponding to Cm overlap each other. However, the present disclosure is not limited to this configuration, and audio text that is obtained by transcribing the audio of an unedited video into text may be stored beforehand in the storage unit 30, so that the CPU 22 may acquire the audio text of a target audio component from the storage unit 30 without transcribing the target audio component into text. In this case, in step S35, a partial caption, which is a "caption that corresponds to an audio component to be output in a target section and that is displayed in the target section", is determined by comparing the caption text acquired in step S33 and the audio text obtained as a result of the CPU 22 transcribing the target audio component into text or the audio text of the target audio component acquired from the storage unit 30 by the CPU 22.

In the first exemplary embodiment, data for representing images included in a video and data for representing captions included in the video are image data and caption data, respectively, which are individual data items. However, the present disclosure is not limited to this case, and data for representing images included in a video and data for representing captions included in the video may be integrated into a single data item first, and the integrated data may be separated into the individual data items when video editing processing is performed.

In the first exemplary embodiment, although captions in a video are displayed sentence by sentence, the present disclosure is not limited to this case, and each caption may be displayed such that the characters of the caption appear one by one.

In the first exemplary embodiment, the order of the processes in each of the flowcharts illustrated in FIG. 2, FIG. 6, and FIG. 9 is an example and may be suitably changed as long as the processing results do not change. In the first exemplary embodiment, in the flowchart illustrated in FIG. 6, the CPU 22 acquires caption text from the caption data corresponding to Cm in step S33 and then acquires, in step S34, audio text of an audio component in a portion in which the target section and the caption section of a caption that is represented by the caption data corresponding to Cm overlap each other. Alternatively, for example, the CPU 22 may determine the audio component in the target section and acquire the audio text of the audio component. After that, the CPU 22 may acquire caption text that corresponds to the audio text.

Second Exemplary Embodiment

A second exemplary embodiment will now be described, and descriptions of the components common to the other exemplary embodiments will be omitted or simplified.

FIG. 14 is a diagram illustrating an example of a confirmation screen in the second exemplary embodiment.

As illustrated in FIG. 14, on the confirmation screen, the CPU 22 causes a partial caption in the first caption 48, which is displayed as the unedited information 60, to be displayed in an identifiable manner. For example, on the confirmation screen illustrated in FIG. 14, a partial caption "I'm Red, the CEO of ABC company." in the first caption 48 "Hello everyone. I'm Red, the CEO of ABC company." is surrounded by a dashed line.

With the above configuration, according to the second exemplary embodiment, a partial caption may be easily determined compared with the case in which all the characters contained in a caption displayed on the confirmation screen are displayed in the same manner.

In the second exemplary embodiment, although the CPU 22 causes a partial caption in the first caption 48, which is displayed as the unedited information 60, to be displayed in an identifiable manner so as to be distinguished from the other captions, the present disclosure is not limited to this configuration, and the partial caption in the edited caption 56, which is displayed as the edited information 62, may be displayed in an identifiable manner so as to be distinguished from the other captions.

Third Exemplary Embodiment

A third exemplary embodiment will now be described, and descriptions of the components common to the other exemplary embodiments will be omitted or simplified.

In the third exemplary embodiment, the CPU 22 receives adjustment of a removal range in the edited caption 56, which is displayed as the edited information 62 on the confirmation screen before a partial caption is removed, and sets the received removal range as a new partial caption.

FIG. 15 is a diagram illustrating an example of the confirmation screen in the third exemplary embodiment.

On the confirmation screen illustrated in FIG. 15, a double line extends through the character string "I'm Red, the CEO of ABC company." in the edited caption 56, which is displayed as the edited information 62, so as to display the character string as a partial caption. In addition, on the confirmation screen, an adjustment mark 70 is displayed as an arrow below the letter "I" that is the first letter of the character string with the double strike-through line. On the confirmation screen, a side-to-side movement of the adjustment mark 70 enables an adjustment of the removal range, which is a partial caption.

Figure 16:
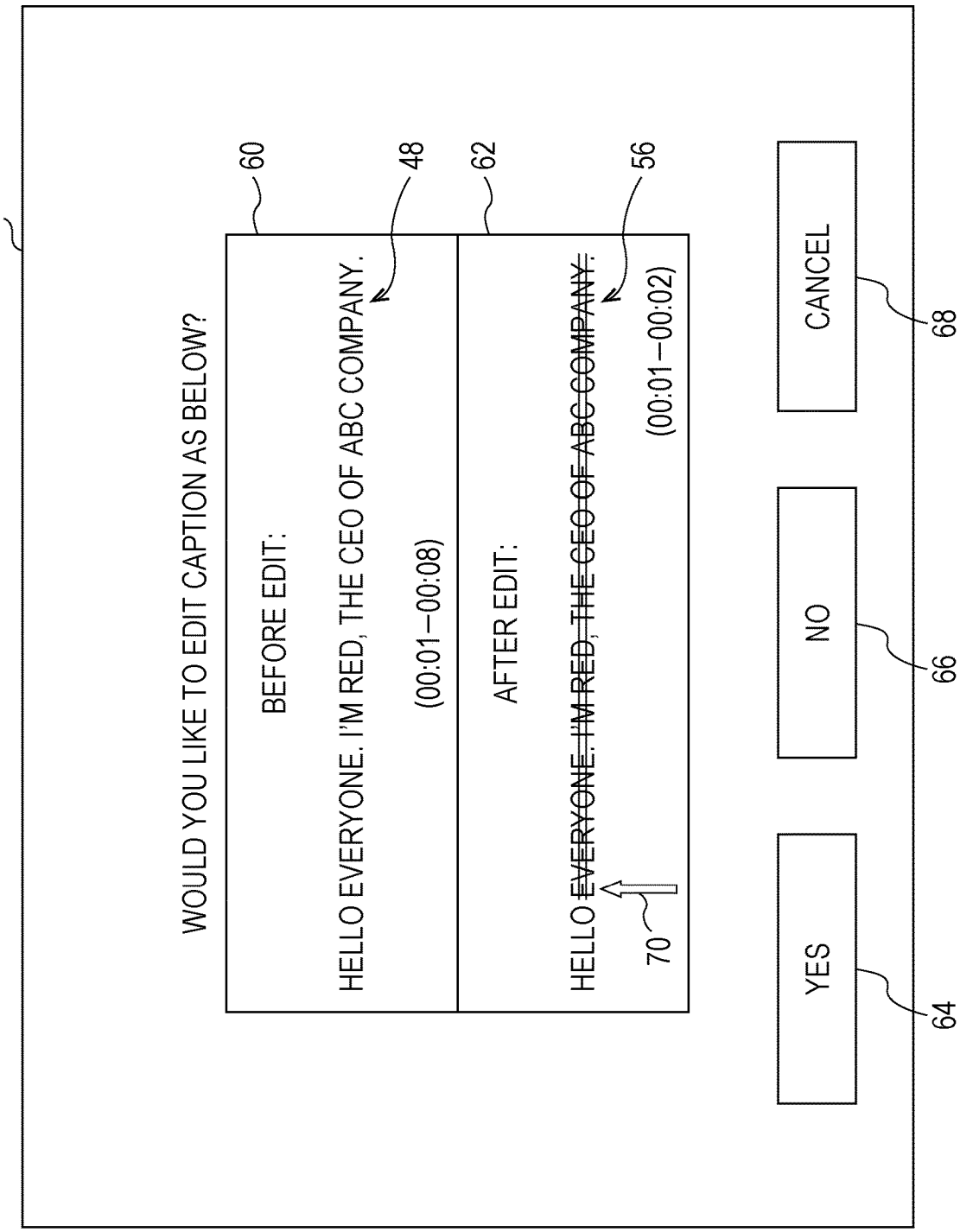
FIG. 16 is a diagram illustrating another example of a confirmation screen in the third exemplary embodiment.

FIG. 16 is a diagram illustrating the state after the adjustment mark 70 has been moved from its position on the confirmation screen illustrated in FIG. 15.

On the confirmation screen illustrated in FIG. 16, the adjustment mark 70 has been moved to the left from its position on the confirmation screen illustrated in FIG. 15, and the first letter of a character string with a double strike-through line is "e". Thus, on the confirmation screen, the double line extends through the character string "everyone. I'm Red, the CEO of ABC company." in the edited caption 56, which is displayed as the edited information 62. In this case, the CPU 22 sets the received removal range "everyone. I'm Red, the CEO of ABC company." as a new partial caption. In addition, along with the change of the partial caption range, the CPU 22 changes the caption section of the edited caption 56 displayed as the edited information 62 to "00:01 to 00:02 (seconds)".

With the above configuration, according to the third exemplary embodiment, adjustment of a removal range in a displayed caption may be performed while checking the contents of the caption.

As illustrated in FIG. 15 and FIG. 16, although the third exemplary embodiment is different from the other exemplary embodiments in that a double line extends through a portion of the edited caption 56, the first caption 48 and the edited caption 56 that are displayed on the confirmation screen contain the same character string "Hello everyone. I'm Red, the CEO of ABC company." In the above-described first and second exemplary embodiments, the first caption 48 and the edited caption 56 have different character strings on the confirmation screen. More specifically, the character string obtained by removing the partial caption from the first caption 48 is displayed as the edited caption 56 (see FIG. 11 and FIG. 14). As described above, the edited caption 56 displayed on the confirmation screen may be the character string obtained by removing the partial caption from the first caption 48 or may be the character string of the first caption 48 in which the partial caption is displayed in an identifiable manner so as to be distinguished from the other captions.

In the third exemplary embodiment, although the CPU 22 receives adjustment of a removal range in the edited caption 56, which is displayed as the edited information 62 on the confirmation screen before a partial caption is removed, the present disclosure is not limited to this configuration, and the CPU 22 may receive adjustment of a removal range in the first caption 48, which is displayed as the unedited information 60 on the confirmation screen before the partial caption is removed.

Fourth Exemplary Embodiment

A fourth exemplary embodiment will now be described, and descriptions of the components common to the other exemplary embodiments will be omitted or simplified.

FIG. 17 is a diagram illustrating an example of a confirmation screen in a fourth exemplary embodiment.

As illustrated in FIG. 17, the CPU 22 displays an edited image 72 that is obtained by removing a partial caption from the target image 54 together with the contents and the caption section of the edited caption 56 as the edited information 62 on the confirmation screen. For example, on the confirmation screen illustrated in FIG. 17, the edited caption 56 "Hello everyone." is displayed together with the first image 44 as the edited image 72.

With the above configuration, according to the fourth exemplary embodiment, the image configuration of a video after a target section has been removed and the contents of a caption that may be generated in the case where the partial caption is removed may be comprehended simultaneously.

In the fourth exemplary embodiment, although the CPU 22 causes a single image and the contents and the caption section of the edited caption 56 to be displayed together as the edited image 72, the present disclosure is not limited to this configuration, and a plurality of images may be displayed as the edited image 72.

Fifth Exemplary Embodiment

A fifth exemplary embodiment will now be described, and descriptions of the components common to the other exemplary embodiments will be omitted or simplified.

The fifth exemplary embodiment is different from the other exemplary embodiments in that the information processing apparatus 10 performs processing for editing a video in which audio and captions are in different languages.

In the fifth exemplary embodiment, the CPU 22 is configured to determine a partial caption by translating the language of the audio in a video into the language of the captions in the video or by translating the language of the captions into the language of the audio.

A case will be described below in which the audio in a video is in English, and the captions in the video are in Japanese, and in which an English audio component to be output in a target section is "I'm Red, the CEO of ABC company. I will explain the financial results for the fourth quarter of 2020.".

In the case where the audio and the captions in a video are in different languages, in step S34 illustrated in FIG. 6, the CPU 22 transcribes an English audio component into English text, the English audio component being contained in a portion in which a removing section and the caption section of a caption that is represented by the caption data corresponding to Cm overlap each other, and then converts the English text into Japanese audio text by using a commonly known translation technology.

For example, in step S34, the CPU 22 transcribes the English audio component into English text "I'm Red, the CEO of ABC company. I will explain the financial results for the fourth quarter of 2020." and then converts the English text into Japanese audio text meaning the English text.

After that, the CPU 22 compares the above Japanese audio text and the Japanese caption text acquired in step S33 and determines the text "I'm Red, the CEO of ABC company." to be the partial caption. Note that the flow of the process after determination of the partial caption is similar to that in the other exemplary embodiments, and thus, description thereof will be omitted.

With the above configuration, according to the fifth exemplary embodiment, a partial caption may be determined even if the audio and the captions in a video are in different languages.

In the fifth exemplary embodiment, although the audio in the video is in English, and the captions in the video are in Japanese, the present disclosure is not limited to this case. The audio in a video may be in Japanese, and the captions in the video may be in English. The combination of the languages of the audio and the captions in a video is not limited to Japanese and English.

In the fifth exemplary embodiment, although the languages of the audio and the captions in the video are preset, the present disclosure is not limited to this case. Each time video editing processing is performed, the languages of the audio and the captions in a video may be obtained, and the languages of the audio and the captions may be set.

Note that the above-described exemplary embodiments may be suitably combined.

In the above-described exemplary embodiments, the CPU 22 included in the information processing apparatus 10 is an example of a processor, and the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
acquire video data that enables playback of a video in which audio, an image, and a caption are chronologically synchronized;
receive an instruction to remove a section of a playback time of the video;
remove a partial caption that corresponds to the audio in the received section and that is at least a portion of the caption from the image in the received section;
display, before the partial caption is removed, a caption that is generated when the partial caption is removed;
receive adjustment of a removal range in the caption displayed before the partial caption is removed; and
set the received removal range as a new partial caption.

2. The information processing apparatus according to claim 1,
wherein the processor is configured to display a caption that is generated when the partial caption is not removed together with the caption that is generated when the partial caption is removed.

3. The information processing apparatus according to claim 2,
wherein the processor is configured to display the partial caption in an identifiable manner so as to be distinguished from other captions.

4. The information processing apparatus according to claim 1,
wherein the processor is configured to display, together with the caption that is generated when the partial caption is removed, at least a portion of the image that is displayed in the section when the partial caption is removed.

5. The information processing apparatus according to claim 2,
wherein the processor is configured to display, together with the caption that is generated when the partial caption is removed, at least a portion of the image that is displayed in the section when the partial caption is removed.

6. The information processing apparatus according to claim 3,
wherein the processor is configured to display, together with the caption that is generated when the partial caption is removed, at least a portion of the image that is displayed in the section when the partial caption is removed.

7. The information processing apparatus according to claim 1,
wherein, when the audio and the caption are in different languages, the processor is configured to determine the partial caption by translating the language of the audio into the language of the caption or by translating the language of the caption into the language of the audio.

8. The information processing apparatus according to claim 2,
wherein, when the audio and the caption are in different languages, the processor is configured to determine the partial caption by translating the language of the audio into the language of the caption or by translating the language of the caption into the language of the audio.

9. The information processing apparatus according to claim 3,
wherein, when the audio and the caption are in different languages, the processor is configured to determine the partial caption by translating the language of the audio into the language of the caption or by translating the language of the caption into the language of the audio.

10. The information processing apparatus according to claim 4,
wherein, when the audio and the caption are in different languages, the processor is configured to determine the partial caption by translating the language of the audio into the language of the caption or by translating the language of the caption into the language of the audio.

11. The information processing apparatus according to claim 5,
wherein, when the audio and the caption are in different languages, the processor is configured to determine the partial caption by translating the language of the audio into the language of the caption or by translating the language of the caption into the language of the audio.

12. The information processing apparatus according to claim 6,
wherein, when the audio and the caption are in different languages, the processor is configured to determine the partial caption by translating the language of the audio into the language of the caption or by translating the language of the caption into the language of the audio.

13. A non-transitory computer readable medium storing a program causing a computer to execute a process for processing information, the process comprising:
acquiring video data that enables playback of a video in which audio, an image, and a caption are chronologically synchronized;
receiving an instruction to remove a section of a playback time of the video;
removing a partial caption that corresponds to the audio in the received section and that is at least a portion of the caption from the image in the received section;
displaying, before the partial caption is removed, a caption that is generated when the partial caption is removed;
receiving adjustment of a removal range in the caption displayed before the partial caption is removed; and
setting the received removal range as a new partial caption.

14. An information processing apparatus comprising:
means for acquiring video data that enables playback of a video in which audio, an image, and a caption are chronologically synchronized;
means for receiving an instruction to remove a section of a playback time of the video;
means for removing a partial caption that corresponds to the audio in the received section and that is at least a portion of the caption from the image in the received section;
means for displaying, before the partial caption is removed, a caption that is generated when the partial caption is removed;
means for receiving adjustment of a removal range in the caption displayed before the partial caption is removed; and
means for setting the received removal range as a new partial caption.

* * * * *